US010259597B1

(12) United States Patent
Spinazze et al.

(10) Patent No.: US 10,259,597 B1
(45) Date of Patent: Apr. 16, 2019

(54) AIRCRAFT FUEL SYSTEM TEST UNIT

(71) Applicant: Tronair Inc., Holland, OH (US)

(72) Inventors: Paul Spinazze, Toledo, OH (US); Sherry Drake, Toledo, OH (US)

(73) Assignee: Tronair, Inc., Holland, OH (US)

( * ) Notice: Subject to any disclaimer, the term of this patent is extended or adjusted under 35 U.S.C. 154(b) by 59 days.

(21) Appl. No.: 15/597,545

(22) Filed: May 17, 2017

Related U.S. Application Data (63) Continuation-in-part of application No. 13/954,186, filed on Jul. 30, 2013.

(60) Provisional application No. 61/680,846, filed on Aug. 8, 2012.

(51) Int. Cl.
*G01M 15/02* (2006.01)
*B64F 5/45* (2017.01)
*B64F 5/60* (2017.01)
*G01M 3/02* (2006.01)

(52) U.S. Cl.
CPC .......... *B64F 5/45* (2017.01); *B64F 5/60* (2017.01); *G01M 3/025* (2013.01)

(58) Field of Classification Search
USPC ........... 73/114.38, 114.41, 114.42, 114.43, 73/114.77, 116.02
See application file for complete search history.

(56) References Cited

U.S. PATENT DOCUMENTS

| | | | | |
|---|---|---|---|---|
| 4,289,027 A | * | 9/1981 | Gleaves | G01F 23/164 73/299 |
| 4,520,773 A | * | 6/1985 | Koslow | F02B 77/04 123/198 A |
| 4,606,311 A | * | 8/1986 | Reyes | F02B 77/04 123/198 A |
| 4,972,700 A | | 11/1990 | Le | |
| 5,000,043 A | * | 3/1991 | Bunch, Jr. | F02M 65/00 73/114.46 |
| 5,155,482 A | * | 10/1992 | Wynn | G01F 25/0061 340/515 |
| 5,305,805 A | * | 4/1994 | Watkins, Jr. | B60P 3/2265 137/615 |
| 5,446,389 A | * | 8/1995 | Lenz | G01R 31/008 246/169 R |
| 5,609,027 A | * | 3/1997 | Dunlevy | B64F 1/28 244/135 A |
| 5,633,457 A | * | 5/1997 | Kilar | F02B 77/04 73/114.45 |
| 5,650,561 A | * | 7/1997 | Tubergen | G01F 23/165 73/1.73 |
| 6,234,002 B1 | * | 5/2001 | Sisney | F02M 65/001 134/166 R |
| 6,276,344 B1 | | 8/2001 | Isobe et al. | |
| 6,349,601 B1 | | 2/2002 | Losee | |
| 6,886,389 B1 | | 5/2005 | Hagar | |
| 7,240,668 B1 | | 7/2007 | DeMinco | |
| 7,962,295 B2 | | 6/2011 | Vianna | |

(Continued)

*Primary Examiner* — Eric S. McCall
(74) *Attorney, Agent, or Firm* — Schaffer, Schaub & Marriott, Ltd.

(57) ABSTRACT

This aircraft maintenance equipment is a fuel system leak test unit, designed to insure installation integrity of fuel system lines and hoses and to ensure that the system is free from any debris generated during the assembly and maintenance process for an aircraft. The unit is designed to check for leaks using vacuum or pressure while monitoring for fuel leaks or bubbles through a clear tube section.

7 Claims, 8 Drawing Sheets

(56) References Cited

U.S. PATENT DOCUMENTS

| | | | |
|---|---|---|---|
| 8,316,811 B1* | 11/2012 | Blundy | F02M 1/16 123/179.9 |
| 2008/0230146 A1* | 9/2008 | Kastner | B64F 1/28 141/192 |
| 2009/0188308 A1* | 7/2009 | Krassinger | G01F 1/22 73/114.42 |
| 2011/0008687 A1* | 1/2011 | Ballantine | G01M 3/28 429/410 |
| 2012/0221152 A1* | 8/2012 | Portocalis | B67D 7/08 700/283 |
| 2012/0241041 A1* | 9/2012 | Myers | B67D 7/3254 141/1 |
| 2014/0007587 A1* | 1/2014 | Spinazze | F02C 9/16 60/787 |
| 2014/0202580 A1* | 7/2014 | Hutchinson | B67D 7/342 141/1 |
| 2014/0216602 A1* | 8/2014 | Kastner | B64F 1/28 141/11 |
| 2014/0334905 A1* | 11/2014 | Spinazze | B60P 3/055 414/482 |
| 2016/0002024 A1* | 1/2016 | Portocalis | B67D 7/08 700/283 |

* cited by examiner

AIRCRAFT FUEL SYSTEM TEST UNIT

CROSS REFERENCE TO RELATED APPLICATION

The present application is a continuation in part of Ser. No. 13/954,185 filed on Jul. 30, 2013. The present patent application is based upon and claims the benefit of Ser. No. 13/954,186 and the benefit of provisional patent application No. 61/680,846 filed on Aug. 8, 2012.

FIELD OF THE INVENTION

The present invention relates to the field of aviation and, more particularly, to the production, commissioning and maintenance of aircraft. Specifically, the invention is a fuel system leak test unit. In one embodiment, the system monitors for fuel leaks in air crafts such as a helicopter.

BACKGROUND OF THE INVENTION

Various aircraft maintenance equipment has been developed for maintaining various portions of an aircraft. Aircraft ground servicing, specifically, provides fuel systems, electrical, hydraulic fluid, and gaseous inputs to aircraft at or on remote locations. An aircraft requires routine service and maintenance to operate and keep it airworthy. A number of services to determine whether the aircraft is in a condition to fly or taxi. These services include but not limited to: fuel systems, electrical power, hydraulic power, engine-start capability (bleed-air), landing gear systems, air conditioning or heating of the aircraft's interior, oxygen system and nitrogen systems.

The present invention is based on the technical problem of insuring installation integrity of fuel system tanks, lines and hoses.

SUMMARY OF THE INVENTION

This fuel system leak test unit insures installation integrity of fuel system lines and hoses and insures that the system is free from any debris generated during the assembly and maintenance processes for a Sikorsky helicopter. The unit is designed to check for leaks using vacuum and/or pressure while the operator is monitoring for fuel leaks or bubbles through a clear tube section. The present invention provides an apparatus for ground servicing and maintenance of aircraft. The present invention provides a fuel system leak test unit, designed to insure installation integrity of fuel system tanks, lines and hoses and to ensure that the system is free from any debris generated during the assembly process for an aircraft. The unit is designed to check for leaks using vacuum or pressure while monitoring for fuel leaks or bubbles through a clear tube section.

The portable aircraft fuel system test cart of this invention comprises: a cart having a mounting surface; and a fuel system leak testing unit mounted on the mounting surface. In a preferred embodiment, the system comprises a clear tube section configured for monitoring for fuel leaks or bubbles through the clear tube section. A source of vacuum or air pressure is connected to the system of fuel lines and hoses.

Other objects and advantages of the present invention will become apparent to those skilled in the art upon a review of the following detailed description of the preferred embodiments and the accompanying drawings.

DETAILED DESCRIPTION OF THE INVENTION

This device operates the fuel transfer cart pump and monitors the fuel stream for continuing presence of air bubbles in the fuel line. The device includes a clear line section configured for monitoring. The clear line section configuration is constructed in accordance with the following criteria.
  1. ACCEPTABLE
    a. No bubbles
    b. Intermittent bubbles up to ⅛ inch (3 mm) diameter
  2. UNACCEPTABLE
    a. Steady stream of bubbles, any size
    b. Bubbles over ⅛ inch (3 mm) diameter
  3. IF UNACCEPTABLE CONDITION EXISTS
    a. Stop fuel transfer cart pump
    b. Place FUEL switch to OFF
    c. Check connection of flush line assembly first, the connections in the last known area of maintenance. Tighten loose connections
    d. Repeat vacuum test FIGS. 1-4 show the major operating components of this invention: air operated motors, cast iron, rotary valve reversible motors with muffler, static discharge lines. The motor operates in extreme temperatures as well as in wet and corrosive environments, with no heat build-up or electric sparking. Air driven pumps: internal gears of cast iron construction and equipped with Viton seals.

Test cart 10 of this invention comprises two pumps 26, at least one gauge 28 and at least one regulator 30 attached to the system 14 of fuel lines and hoses. The test cart further comprising two air operated motors 32 for driving the pumps 26. Control panel 34 is connected to system 14. Fuel particle filter 16 is attached to the air system wherein the particle filter a 0.5 to micron particle filter. System 14 further comprises suction hose 40 and discharge hose 42. Test cart 10 also includes mounting surface 12. Particulate filter 18 is attached to the air system with hose 18.

Figure 1:
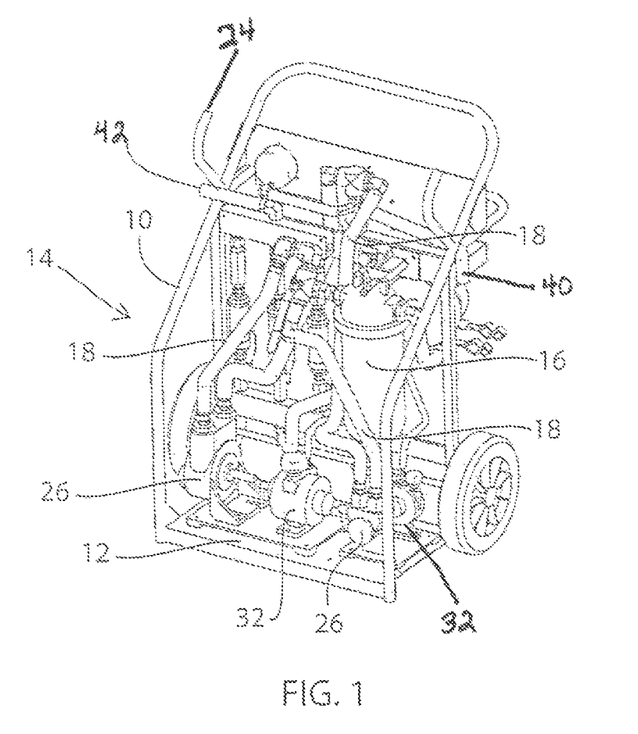
FIG. 1 is a perspective view of the test unit of this invention.
Figure 2:
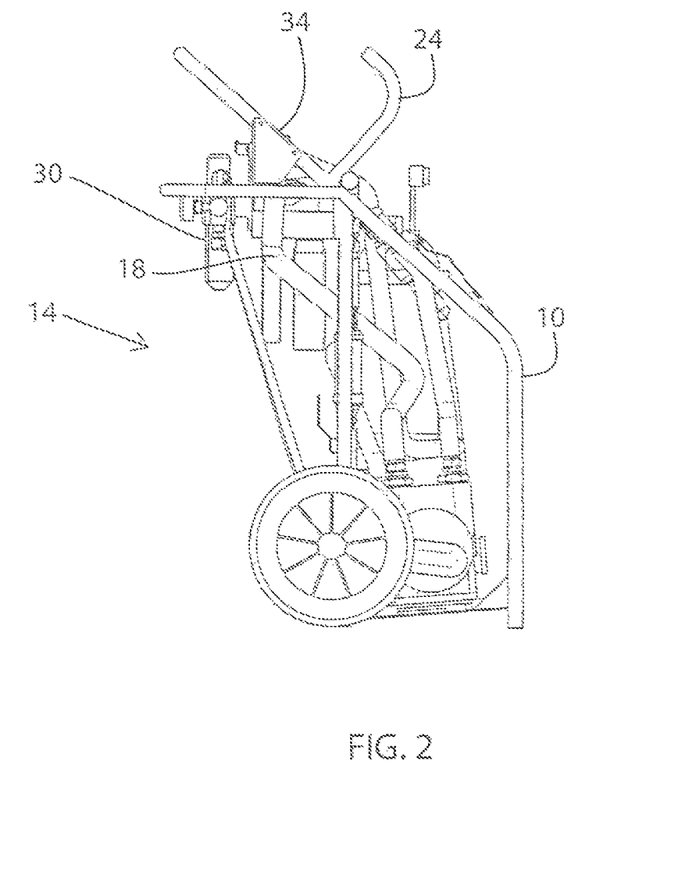
FIG. 2 is a side view of the test unit of this invention.
Figure 3:
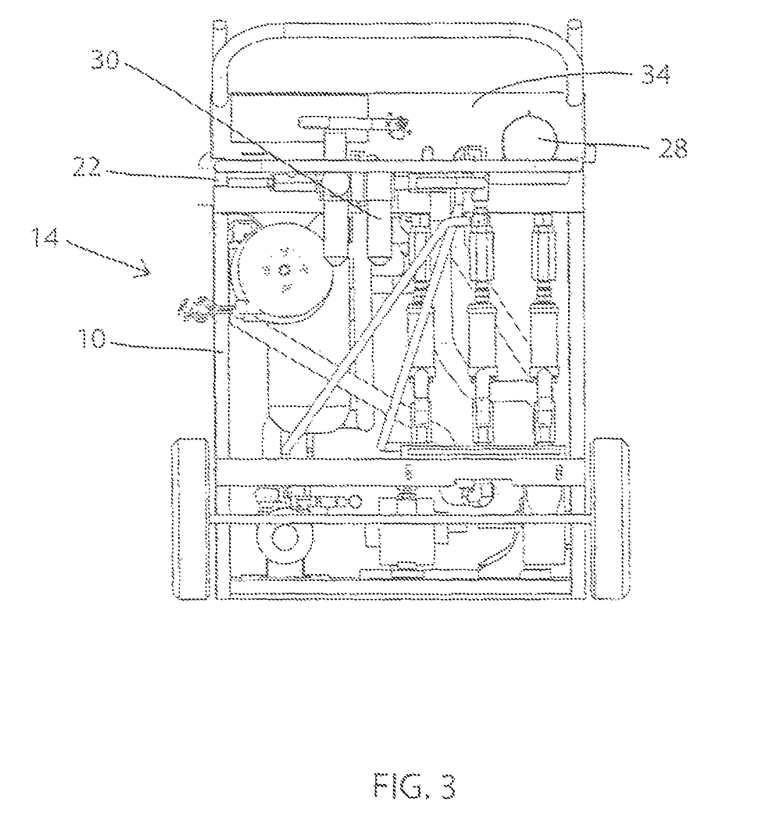
FIG. 3 is a front view of the test unit of this invention.
Figure 4:
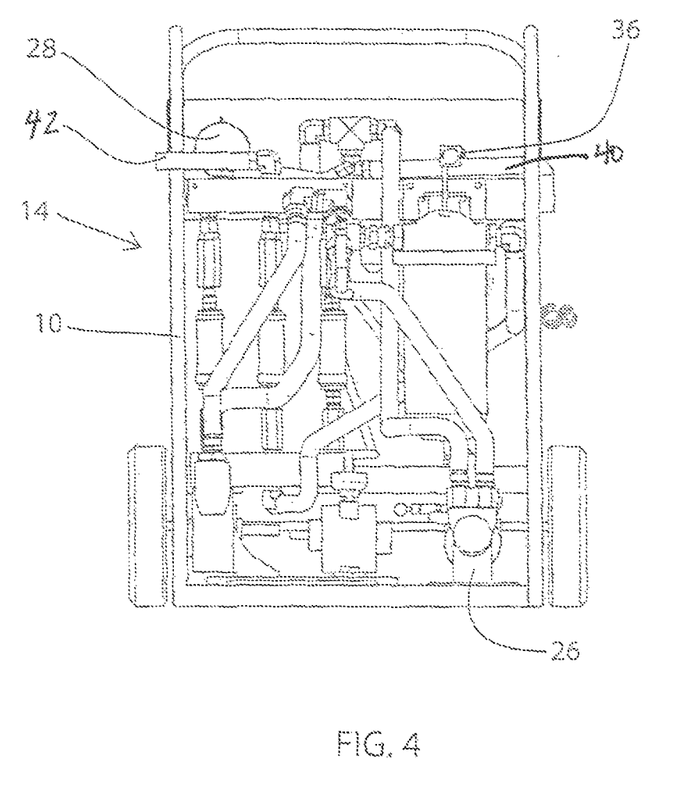
FIG. 4 is a back view of the test unit of this invention.

FIG. 3 shows air connection 22. A source of shop air (not shown) is connected to air connection 22. The maximum air pressure typically is 50 psi.

System 14 also includes hose hanger 24, suction hose 40 and discharge hose 42. Flow meter 36 is connected to particulate filter 16.

Flow meters: three certified flow meters: 0.5-1 gpm, 1.0-5.0 gpm, and 1-15 gpm. The flow meters operate using the variable annular orifice method with compression spring return. The flow meters magnet follower, where the measurement is indicated, is magnetically coupled through a high pressure casing to the meter's internal orifice assembly.

Fuel filter with differential pressure gauge: The fuel filter has ½ micron fuel filtration (98% particle removal efficiency). The differential pressure gauge allows for a simple reading on an easy-to-read scale that alerts the user of the condition of the process.

Air filter, regulator, lubricator: filters have a polypropylene element that removes particles as small as 5 microns. Drain is automatic. Body and bowl are aluminum.

Specifications:
- Welded cart with 12" diameter wheels
- Tool Tray
- Air operated pumps
- 12 GPM maximum flow
- 50 PSI maximum operating pressure
- 50 PSI Safety valve
- Air inlet control valve
- ½ micron fuel filtration (98% particle removal efficiency)
- 20 foot and 50 foot static discharge reels
- 20 foot suction hose with shutoff valve
- 40 foot discharge hose
- Various suction hose adaptors
- Air inlet regulator pressure gauge, filter and oiler Operating Instructions:
1. Check fluid level in air lubricator and air filter sight glass
2. Attach both static discharge lines to aircraft and containment unit
3. Ensure air supply ball valve and air flow control valve are in the off position
4. Attach air supply to unit
5. Slowly open air supply ball valve
6. Adjust regulator pressure as required, do not exceed 50 psi
7. Select high flow or low flow air requirement on control panel
8. Select high flow or low flow fuel pump requirement on control panel
9. Select high flow or low flow fuel pump requirement on unit
10. Select desired glow meter discharge rate
11. Adjust air flow control valve as required to start fuel flow Static discharge lines are connected to the aircraft and fuel sponson. Next the operator will connect the suction hose from the cart to the aircraft and the discharge hose from the cart into a fuel sponson. The air hose from the cart will get connected to the customers air supply. The air supply valve is slowly opened and regulated as required ensuring that the air flow control valve is in the off position. The air flow and fuel pump flow is selected based on the testing requirement. Next the flow meter discharge rate is selected on one of the three flow meters. The air flow control valve is then adjusted as required to start the fuel flow and begin fuel system testing.

EXAMPLE I

This fuel system leak test unit insures installation integrity of fuel system lines and hoses and to ensure that the system is free from any debris generated during the assembly and maintenance processes for a Sikorsky helicopter. The unit is designed to check for leaks using vacuum and/or pressure while the operator is monitoring for fuel teaks or bubbles through a clear tube section.

Major Operating Components:

Air Motors: Cast iron, rotary van reversible motors with muffler. The motor operates in extreme temperatures as well as in wet and corrosive environments, with no heat build-up or electric sparking.

Air Driven Pumps: Internal gears of cast iron construction and equipped with Viton seals.

Flow meters: Three certified flow meters: 0.5-1 gpm, 1.0-5.0 gpm, and 1-15 gpm. The flow meters operate using the variable annular orifice method with compression spring return. The flow meters magnet follower, where the measurement is indicated, is magnetically coupled through a high pressure casing to the meter's internal orifice assembly.

Fuel Filter with differential pressure gauge: The fuel filter has ½ micron fuel filtration (98% particle removal efficiency). The differential pressure gauge allows for a simple reading on an easy-to-read scale that alerts the user of the condition of the process.

Air Filter, regulator lubricator: Filters have a polypropylene element that removes particles as small as 5 microns. Drain is automatic. Body and bowl are aluminum.

Specifications:
- Overall Height: 43"
- Overall Width: 34½"
- Overall Depth: 25 11/16"
- Weight: 300 pounds
- Finish: Tronair Blue Acrylic Enamel
- Welded cart with 12" diameter wheels
- Tool Tray
- Air operated pumps
- 12 GPM maximum flow
- 50 PSI maximum operating pressure
- 50 PSI Safety valve
- Air inlet control valve
- ½ micron fuel filtration (98% particle removal efficiency)
- 20 foot and 50 foot static discharge reels
- 20 foot suction hose with shutoff valve
- 40 foot discharge hose
- Various suction hose adaptors
- Air inlet regulator, pressure gauge, filter and oiler Operating Instructions:
1. Check fluid level in air lubricator and air filter sight glass
2. Attach both static discharge lines to aircraft and containment unit
3. Ensure air supply ball valve and air flow control valve are in the off position
4. Attach air supply to unit
5. Slowly open air supply ball valve
6. Adjust regulator pressure as required, do not exceed 50 psi
7. Select high flow or low flow air requirement on control panel
8. Select high flow or low flow fuel pump requirement on control panel
9. Select high flow or low flow fuel pump requirement on unit
10. Select desired flow meter discharge rate
11. Adjust air flow control valve as required to start fuel flow Static discharge lines are connected to the aircraft and fuel sponson. Next the operator will connect the suction hose from the cart to the aircraft and the discharge hose from the cart into a fuel sponson. The air hose from the cart will get connected to the customers air supply. The air supply valve is slowly opened and regulated as required ensuring that the air flow control valve is in the off position. The air flow and fuel pump flow is selected based on the testing requirement.

Next the flow meter discharge rate is selected on one of the three flow meters. The air flow control valve is then adjusted as required to start the fuel flow and begin fuel system testing.

Figure 5:
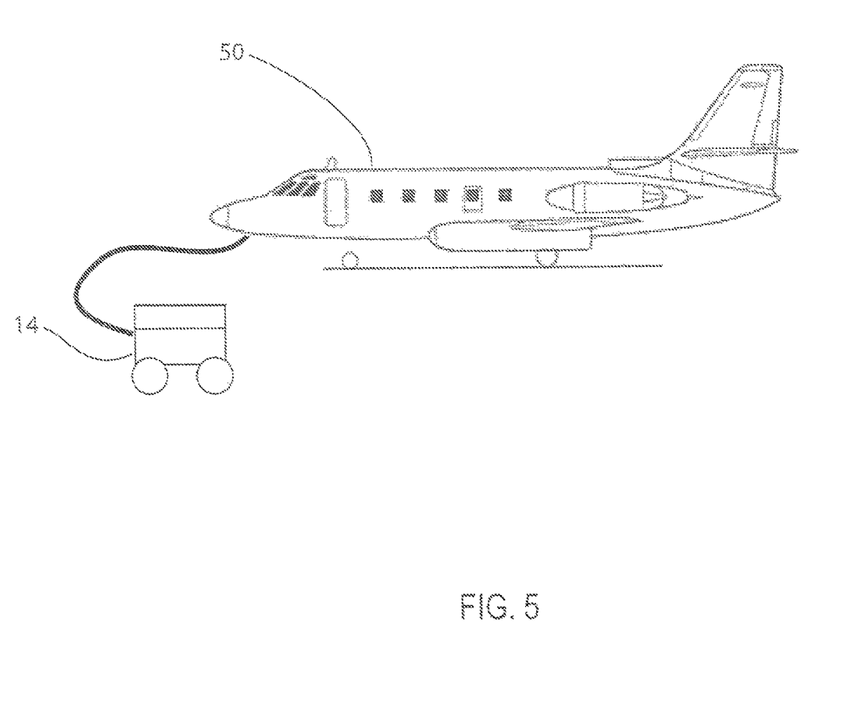
FIG. 5 is a general view shewing a typical aircraft.

FIG. 5 is a general view showing a typical aircraft with the unit of this invention attached thereto. FIG. 5 shows system 14 attached to aircraft 50.

Figure 6:
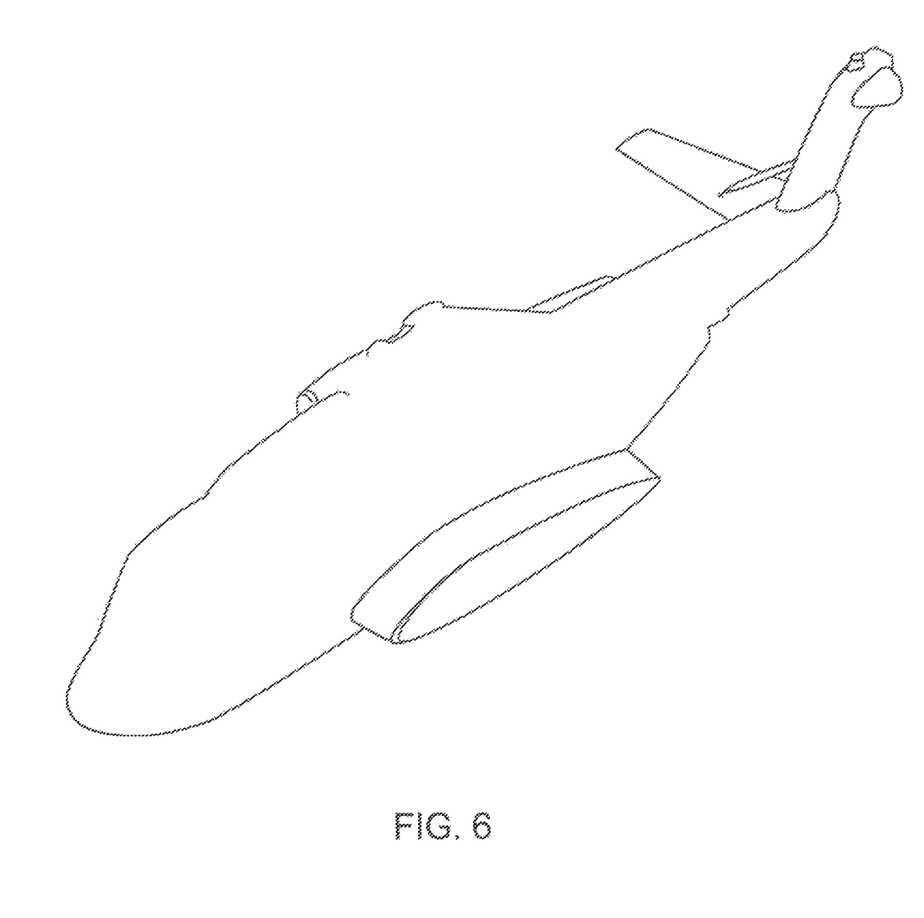
FIG. 6 is a general view showing an aircraft that is a helicopter.

FIG. 6 is a general view showing an aircraft that is a helicopter.

Figure 7:
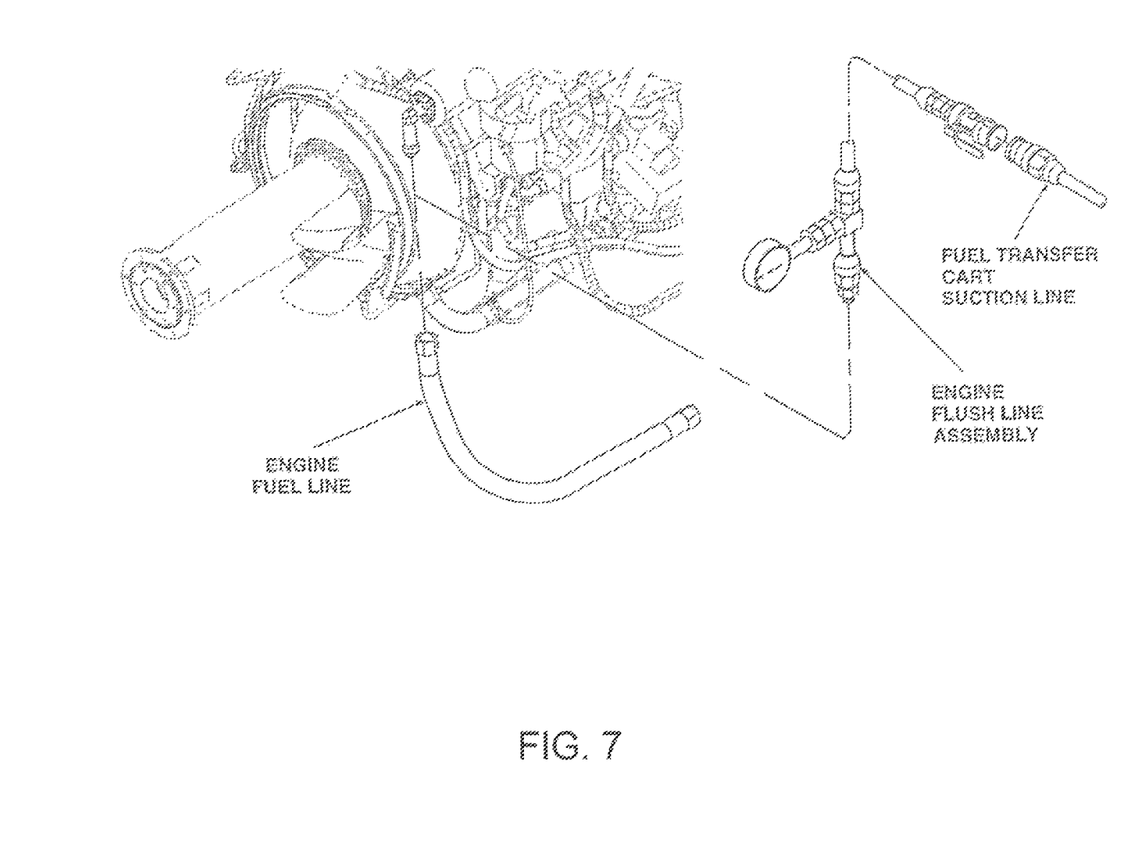
FIG. 7 shows a helicopter engine, engine fuel line and engine fuel line interface to the test unit.

FIG. 7 shows a helicopter engine, engine fuel line and engine fuel line and engine fuel line interface to the test unit.

Figure 8:
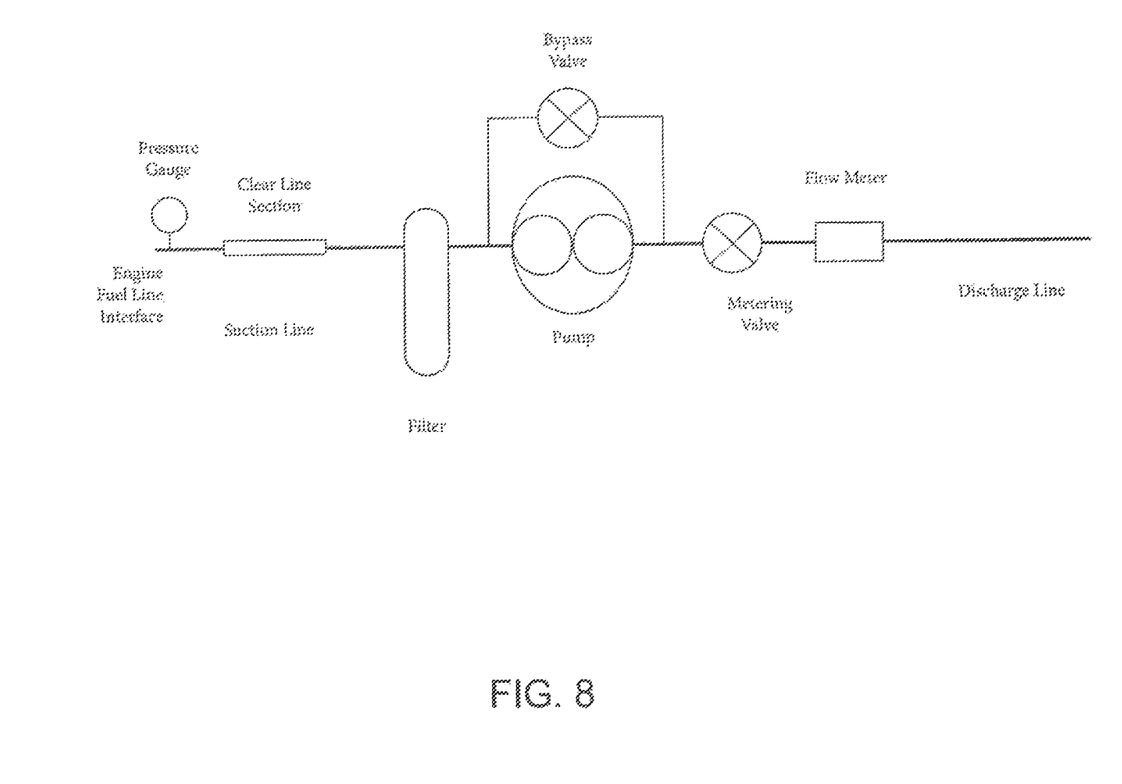
FIG. 8 is a drawing snowing the operation of the fuel system test unit.

FIG. 8 shows the operation of the fuel system test unit of this invention. The engine fuel line shown in FIG. 7 connects to the fuel line interface shown in FIG. 8.

EXAMPLE II

This system is designed to insure installation integrity of fuel system lines and hoses and to ensure that the system is free from any debris generated during assembly process. The system will be tested for leaks using vacuum or pressure while monitoring for fuel leaks or bubbles through a clear tube section. Fuel under pressure will be supplied either by using the aircraft electrically operated prime pumps and facility/tanker truck pumps while vacuum will be generated by using a facility/tanker truck vacuum pump.

Safety measures shall be observed throughout the procedures especially when operating fuel pumps and/or transferring fuel hoses. In case of any unexpected result or observation, stop immediately, shut off the fuel supply, disconnect the electrical connection and investigate carefully before proceeding.

FIG. 8 is a drawing showing the operation of the fuel system test unit. Follow the following procedures:

First start the prime pump.

Do not run the prime pump continuously for more than 5 minutes without fuel flow. Visually verify fuel flow through the clean line section and establish clear and steady fuel stream. Stop the fuel and verify that the fuel has stopped.

Start the facility flush pump. Monitor the inlet filter differential pressure gage and verify that $\Delta P \leq 10$ psid.

Monitor the vacuum gage and verify that the vacuum pressure does not exceed −19 in. Hg. If the vacuum exceeds −19 in. Hg, inspect for blockage in the system.

Run the flush pump for a minimum of 15 minutes then stop the pump.

Start the facility Engine Leak Test Pump. Adjust the speed of the pump to establish a flow on the flowmeter. This may vary depending on the engine being tested. For example, 0.3-2 gpm or 2-6 gpm depending on the engine being tested. If an unacceptable condition exists, stop the facility leak-test pump, repair any leaks, and repeat teak-test. Fuel level must always be on top of bridge to allow priming and leak check. Add fuel to the sponson as needed to allow system priming.

Run the Engine leak Test Pump for 5 minutes to clear up any initial bubbles. After the initial 5-minute period, continue to run the pump while monitoring Engine Fuel clear line for the presence of bubbles in accordance with the following criteria:

1. UNACCEPTABLE
   Bubbles greater than ⅛-inch diameter
   Bubbles less than ⅛-inch diameter, which appears at a constant rate
2. ACCEPTABLE
   Bubbles less than ⅛ inch diameter, which appears intermittently
   No bubbies
   Shut down the Engine Leak Test Pump.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A portable aircraft fuel system test apparatus comprising:
   a cart (10) having a mounting surface (12); and
   a fuel system leak testing unit (14) mounted on the mounting surface wherein the fuel system leak testing unit (14) comprises a fuel particle filter (16), lines and hoses (18) and wherein the testing unit (14) further comprises;
   an engine fuel line interface;
   a discharge lie, and a suction line comprising a clear line section;
   wherein the clear line section is located between the engine fuel line interface and the discharge line;
   wherein the clear line section is configured for monitoring for the presence of bubbles.

2. A test apparatus according to claim 1 further comprising a source of vacuum or air pressure is connected to air connection (22) connected to the system of fuel lines and hoses (18).

3. A test apparatus according to claim 1 further comprising a control panel (34) connected to the fuel system test apparatus.

4. A test apparatus according to claim 1 wherein the fuel particle filter (16) is a 0.5 to 1 micron particle filter.

5. An apparatus according to claim 1 further comprising:
   a means for stopping fuel transfer to the test unit.

6. A test apparatus according to claim 1 wherein the testing unit (14) further comprises pumps (26), at least one test gauge (28) and at least one regulator (30) located between the engine fuel line interface and the discharge line.

7. A test apparatus according to claim 6 further comprising air operated motors (32) for driving the pumps (26).

* * * * *

UNITED STATES PATENT AND TRADEMARK OFFICE
CERTIFICATE OF CORRECTION

PATENT NO. : 10,259,597 B1
APPLICATION NO. : 15/597545
DATED : April 16, 2019
INVENTOR(S) : Paul Spinazze and Sherry Drake Page 1 of 1

It is certified that error appears in the above-identified patent and that said Letters Patent is hereby corrected as shown below:

In the Claims

Please replace "lie" in Column 6, Line 33, with - line -.

Signed and Sealed this
Twenty-first Day of May, 2019

Andrei Iancu
*Director of the United States Patent and Trademark Office*